United States Patent
Park et al.

(10) Patent No.: US 10,922,239 B2
(45) Date of Patent: Feb. 16, 2021

(54) DEVICE FOR PERFORMING ITERATOR OPERATION IN DATABASE

(71) Applicant: SAMSUNG ELECTRONICS CO., LTD., Suwon-si (KR)

(72) Inventors: Young-Ho Park, Anyang-si (KR); Sungkug Cho, Hwaseong-si (KR); Byoung Young Ahn, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 15/857,857

(22) Filed: Dec. 29, 2017

(65) Prior Publication Data

US 2019/0205258 A1 Jul. 4, 2019

(51) Int. Cl.
*G06F 12/10* (2016.01)
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/2022* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 7,409,526 B1 * | 8/2008 | Ng | H04L 9/0894 711/216 |
| 7,676,444 B1 * | 3/2010 | Venkatachary | G06F 16/90344 706/48 |
| 8,433,695 B2 | 4/2013 | Wu et al. | |
| 9,075,710 B2 | 7/2015 | Talagala et al. | |
| 9,129,118 B1 * | 9/2015 | Johansson | G06F 21/6227 |
| 9,454,476 B2 | 9/2016 | Colgrove et al. | |
| 9,519,575 B2 | 12/2016 | Ramsundar et al. | |
| 9,569,141 B2 | 2/2017 | Foong et al. | |
| 2002/0184430 A1 * | 12/2002 | Ukai | G06F 9/355 711/3 |
| 2003/0204703 A1 * | 10/2003 | Rajagopal | G06F 7/02 711/216 |
| 2009/0157701 A1 * | 6/2009 | Lahiri | G06F 16/2246 |
| 2012/0102298 A1 | 4/2012 | Sengupta et al. | |
| 2015/0074084 A1 | 3/2015 | Bogrett | |
| 2015/0121034 A1 * | 4/2015 | Steele, Jr. | G06F 12/1018 711/216 |
| 2019/0065494 A1 * | 2/2019 | Abali | G06F 12/0866 |

* cited by examiner

Primary Examiner — Ryan Bertram
(74) Attorney, Agent, or Firm — Lee IP Law, PC

(57) ABSTRACT

A storage device includes a controller that receives a value corresponding to data stored in a memory and a key to be referenced to identify the value from a host. In addition, the controller manages partial key-value mapping information indicating a correspondence relationship between a partial key and a value address, and returns information to the host in response to a host request. The information corresponds to a key that includes a same character as a character at a specific position of the received key. The controller to determine the information by determining a partial region of the memory that stores the data based on the partial key-value mapping information and performing a read operation on the partial region to obtain an entire key including the partial key.

18 Claims, 9 Drawing Sheets

DEVICE FOR PERFORMING ITERATOR OPERATION IN DATABASE

BACKGROUND

1. Field

One or more embodiments described herein relate to a device for performing an iterator operation in a database.

2. Description of the Related Art

A database system may be used to store a variety of data (e.g., audio data, video data, and/or other information) and may be accessed frequently to satisfy user requests. Over the years, the amount of database traffic has increased significantly. Accordingly, attempts have been made to reduce or distribute traffic in order to ease the burden on the database system.

One attempt involves using a data storage technology such as SQL (NoSQL) to store data in a key-value form in a block device such as a solid state disk (SSD). However, a database system using a block device may perform unnecessary mapping translation, e.g., may translate a key into a logical block address (LBA) that is a logical address and again translate the LBA into a physical block number (PBN) that is a physical address.

SUMMARY

In accordance with one or more embodiments, a storage device includes a memory to store data and a controller to receive a value corresponding to the data stored in the memory and a key to be referenced to identify the value from a host, and to manage partial key-value mapping information indicating a correspondence relationship between a partial key and a value address, wherein the controller is to return information to the host in response to a host request, the information corresponding to a key that includes a same character as a character at a specific position of the received key. The controller is to determine the information by determining a partial region of the memory that stores the data based on the partial key-value mapping information, and performing a read operation on the partial region to obtain an entire key including the partial key.

In accordance with one or more other embodiments, an electronic device includes a host and a storage device including a memory to store data, wherein the storage device is to receive a value corresponding to the data stored in the memory device and a key to be referenced to identify the value from the host, and is to manage key-value mapping information, the storage device to return information to the host, the information corresponding to a key including a same character as a character at a specific position of the received key, the information to be determined using the key-value mapping information based on a request from the host.

In accordance with one or more other embodiments, a storage device includes a memory to store data and a controller to receive a value corresponding to the data stored in the memory and a key to be referenced to identify the value from a host and to manage key-value mapping information, wherein the controller is to returns information to the host, the information corresponding to a key including a same character as a character at a specific position of the received key, the controller to determine the information based on the key-value mapping information in response to a host request.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
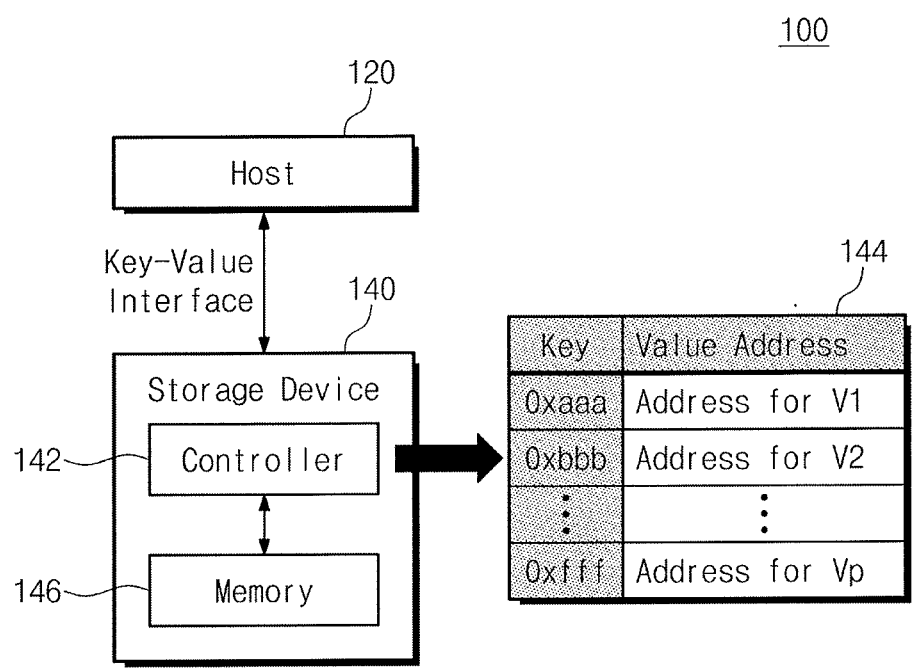
FIG. 1 illustrates an embodiment of a system.

FIG. 1 illustrates an embodiment of a system 100 that may store data, manage the stored data, and provide information to a user. The system 100 may be, for example, a database for storing data or a database management system that manages a database to maintain stored data in a consistent, integrity state. According to an embodiment, the system 100 may be one or more electronic devices or user devices. Examples of these devices include a personal computer or a mobile electronic device such as a portable phone, a personal digital assistant (PDA), a camera, or another device.

The system 100 may include a host 120 and a storage device 140 that manage data while communicating with each other. For example, the host 120 may request data from the storage device 140 or may store data in the storage device 140. Also, the host 120 may erase data being stored in the storage device 140.

The host 120 may provide various services to the user of the host 120 depending, for example, on operations of one or more electronic circuits/chips/devices. The host 120 may perform various operations to process an instruction received from the user of the host 120 and may then provide the operation results to the user of the host 120. According to an embodiment, the host 120 may include an operating system, an application, or another form of other hardware or software. According to an embodiment, the host 120 may include an operation processor (e.g., a central processing unit (CPU), a graphics processing unit (GPU), and an application processor (AP)) including dedicated logic circuits (e.g., a field programmable gate array (FPGA) and an application specific integrated circuits (ASICs)).

According to an embodiment, the host 120 may be an electronic device that is independent of the storage device 140. For example, the host 120 may be a mobile communication terminal, a desktop computer, a notebook computer, a tablet computer, a smartphone, a wearable device, or another device. In one embodiment, the host 120 may be a workstation, another server, or a vehicle. According to an embodiment, the host 120 may be in a single electronic device together with the storage device 140. In one example, the host 120 may be the operation processor itself. The host 120 may request the storage device 140 to perform various operations associated with specific data using a key-value interface.

The storage device 140 may receive, from the host 120, a value corresponding to data to be stored in a memory device 146 and a key to be referenced to identify the value. The storage device 140 may include a controller 142 and the memory device 146 for storing data. The memory device 146 may include, for example, at least one sub memory device for storing data.

The controller 142 may manage and control operations of the memory device 146 based on a request from the host 120. Also, the controller 142 may receive, from the host 120, a value corresponding to data to be stored in the memory device 146 and a key to be referenced to identify the value. For example, the controller 142 may receive, from the host 120, various commands using information corresponding to a key as a parameter. The controller 142 may manage key-value mapping information.

According to an embodiment, the controller 142 may be connected with the memory device 146 through a plurality of channels. The controller 142 may be implemented in hardware or software for performing operations based on various requests from the host 120. According to an embodiment, the controller 142 may include, for example, a volatile memory such as a dynamic random access memory (DRAM), a static random access memory (SRAM), or a synchronous DRAM (SDRAM).

According to one embodiment, the controller 142 may include at least one processor for performing various operations for controlling overall operations of the storage device 140. The processor may include, for example, one or more dedicated logic circuits (e.g., FPGA and ASICs) that perform various arithmetic operations and/or logical operations.

The memory device 146 may include at least one non-volatile memory. In one embodiment, the memory device 146 may include a plurality of flash memories. In one embodiment, the memory device 146 may include another type of non-volatile memory, e.g., a phase-change RAM (PRAM), a ferrroelectric RAM (FRAM), or a magneto-resistive RAM (MRAM). The memory device 146 may store one data bit or two or more data bits per memory cell. In one embodiment, the non-volatile memory used to implement the memory device 146 may include a memory cell array of a three-dimensional structure. For example, the storage device 140 may include any type of memory device for storing data.

According to an embodiment, to request the storage device 140 to perform various operations, the host 120 may transmit, to the storage device 140, various commands using information corresponding to a key as a parameter. The key may be, for example, a character string. The character string may be one or more characters, and a character may include various data types capable of being handled in a computing device. For example, the character string may include one or more numbers, bit values, characters, or a combination thereof.

The storage device 140 that receives the information of the key and the request from the host 120 may perform an operation corresponding to the request using key-value mapping information 144. Various requests (e.g., commands), to be transferred from the host 120 to the storage device 140, may be received by the controller 142 of the storage device 140. The controller 142 may perform an operation corresponding to a received request and may return the performed result to the host 120.

The key-value mapping information 144 may be, for example, information indicative of a correspondence relationship between a key and a value. According to an embodiment, the key-value mapping information 144 may be managed in the form of a table. In another embodiment, the key-value mapping information 144 may be managed in a different form. In one embodiment, the form for managing the key-value mapping information may be variously changed or modified. For example, the key-value mapping information 144 may be managed by a memory device of a controller 142 (controller memory device) of the storage device 140. In one embodiment, the key-value mapping information 144 may be stored and managed in a volatile memory of the controller 142 in the storage device 140.

According to an embodiment, the key-value mapping information 144 may be managed to allow a key "0xbbb" to correspond to an address of a memory region, at which data corresponding to a value V2 are stored, and a key "0xfff" to correspond to an address of a memory region at which data corresponding to a value Vp are stored. The key-value mapping information 144 may be information mapping a key and a location of a memory at which a value corresponding to the key are stored. The storage device 140 may manage the key-value mapping information 144, for example, to allow one value to correspond to one key.

According to an embodiment, the host 120 may transfer a read request (e.g., a get or read operation) to the storage device 140 together with a key. The storage device 140 may output, to the host 120, data stored at an address corresponding to the received key based on the received key. For example, when the host 120 intends to read the value V1 from the storage device 140, the host 120 may transfer the key "0xaaa" corresponding to the value V1 to the storage device 140 together with a read command. The storage device 140 may recognize an address in the memory device 146, at which data corresponding to the value V1 are stored, with reference to the key "0xaaa" of the key-value mapping information 144. The storage device 140 may read data corresponding to the value V1 from the recognized address and may output the value V1 to the host 120.

According to an embodiment, the host 120 may transfer a write request (e.g., a put or write operation) to the storage device 140 together with a key. The storage device 140 may write (or store) data at an address corresponding to the received key based on the received key. For example, when the host 120 intends to store the value V1 in the storage device 140, the host 120 may transfer the value V1 and the key "0xaaa" corresponding to the value V1 to the storage device 140 together with a write command. The storage device 140 may store data corresponding to the value V1 in the memory device 146. The storage device 140 may store an address of the memory device 146, at which the data corresponding to the value V1 are to be stored, and the key "0xaaa" in the key-value mapping table 144. The key-value mapping information 144 may be managed such that the key "0xaaa" corresponds to the address of a memory region, at which the data corresponding to the value V1 are stored. The key-value mapping information 144 may be, for example, partial key-value mapping information.

According to an embodiment, the host 120 may transfer an erase request (e.g., a delete, unmap, or erase operation) to the storage device 140 together with a key. The storage device 140 may erase data existing at an address corresponding to the received key based on the received key. For example, when the host 120 intends to erase the value V1 from the storage device 140, the host 120 may transfer the key "0xaaa" corresponding to the value V1 to the storage device 140 together with an erase command. The storage device 140 may recognize an address in the memory device 146, at which data corresponding to the value V1 are stored, with reference to the key "0xaaa" of the key-value mapping information 144 and may erase data existing at the recognized address.

According to an embodiment, the host 120 may transfer a request for checking whether a key exists to the storage device 140 together with the key. The storage device 140 may check whether data corresponding to the received key exists, based on the received key. For example, the host 120 may transfer, to the storage device 140, the key "0xbbb" corresponding to the value V2 together with a command to check whether the key exists. The storage device 140 may check whether the received key "0xbbb" is present in the key-value mapping information 144 and may return the check result to the host 120.

According to an embodiment, the host 120 may request the storage device 140 to search for and return all keys including the same character as a character at a specific position in a key, at the same position as the specific position together with a key. The specific position may correspond, for example, to a position of a specific character in a character string that includes one or more characters. The specific position may correspond, for example, to a position in a key specified by the host 120. In one embodiment, when a key includes 6 characters ABCDEF, the specific position may be the third position and the character C may be at the third position. When, for example, a key includes 8 bits 00111100, the specific location may be the sixth and seventh positions and bit values 1 and 0 may be at the sixth and seventh positions. The specific position may include one or more positions in a key, and the one or more positions may be continuous or apart from each other.

The storage device 140 may receive, from the host 120, a request to return information about all keys received from the host 120 that include the same character at one or more specific positions of the keys. For example, when the entire character string of a key is ABCDEFGH, specific positions may include the third position and the fourth position of a key, and the characters at the specific positions may be characters C and D. The storage device 140 may search for all keys including characters at the specific positions (e.g., all keys including a character at the third position is C and a character at the fourth position is D), which is the same as a key received from the host 120, with reference to the key-value mapping information 144. The storage device 140 may then return information about all the found keys to the host 120. In accordance with at least one embodiment, an iterator operation may be referred to as an operation for obtaining information about all keys including the same character at a specific position of a reference key (e.g., a key received from the host 120) and for returning the obtained information to the host 120.

Figure 2:
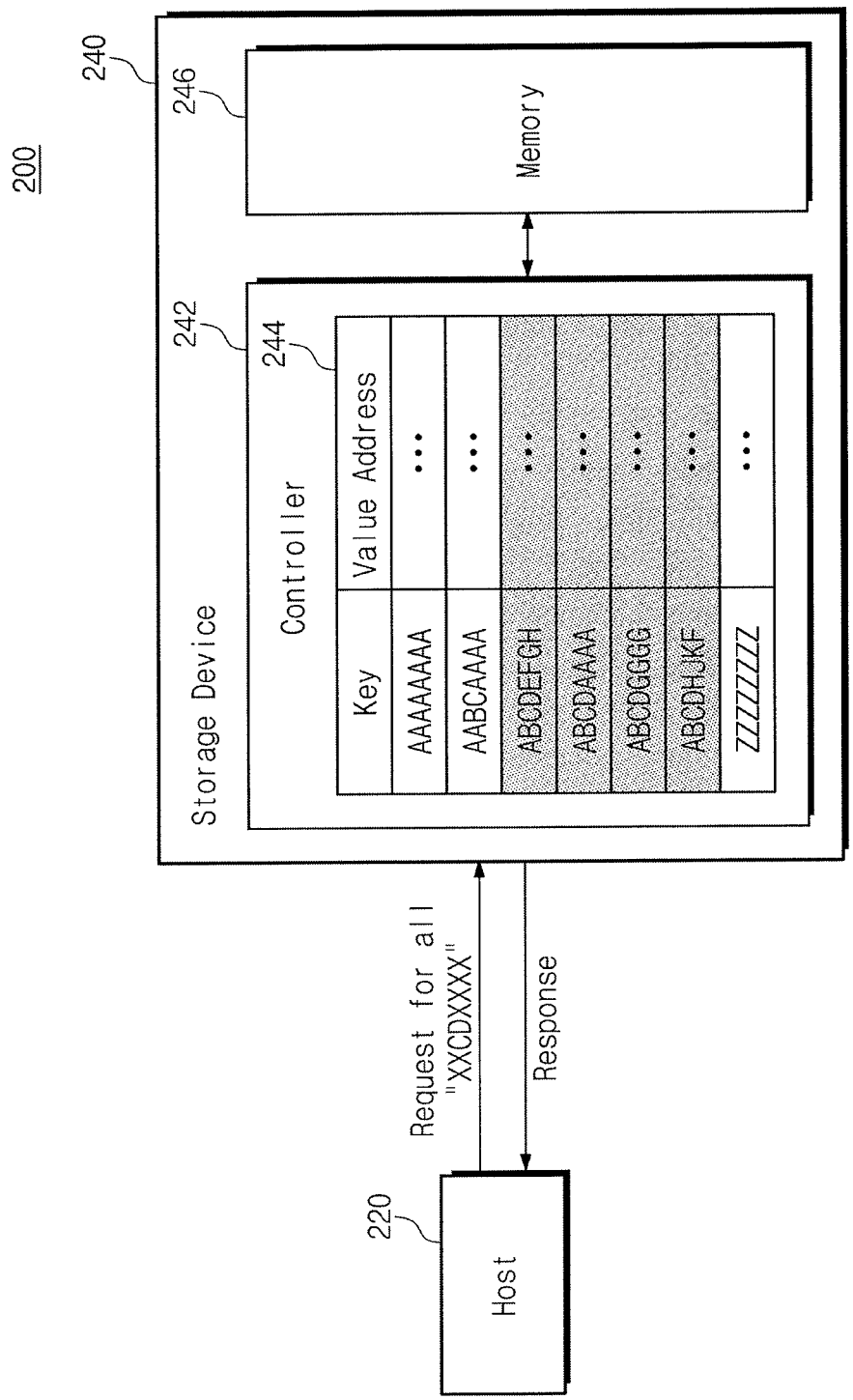
FIG. 2 illustrates an embodiment of an iterator operation.

FIG. 2 illustrates an embodiment of an iterator operation performed within a system 200. The system 200 may be, for example, a more detailed embodiment of the system 100 of FIG. 1 for performing the iterator operation. The host 220, storage device 240, controller 242, key-value mapping information 244, and memory device 246 in FIG. 2 may correspond to the host 120, the storage device 140, the controller 142, the key-value mapping information 144, and the memory device 146 of FIG. 1, respectively.

As described above, an iterator operation may include an operation that involves searching for all keys having a character at a specific position is the same as a character at the specific position of a reference key (e.g., a key received from a host). The iterator operation may be used, for example, for spatial efficiency of a database. According to an embodiment, the host 220 may perform recompression, garbage collection, rebuild, consistency check, etc., based on the result of the iterator operation.

According to an embodiment, the host 220 may request information for all keys corresponding to XXCDXXXX from the storage device 240 together with XXCDXXXX. In this embodiment, X in a key may be a character and the transferred key XXCDXXXX may be all keys having a character at the third position of a character string and a character at the fourth position of the character string that are C and D, respectively. For example, the host 220 may transfer, to the storage device 240, an iterator command requesting information about all keys having a character at the third position and a character at the fourth position that are C and D, respectively. The storage device 240 that receives a request associated with the iterator operation may search for all keys having characters C and D at these positions with reference to the key-value mapping information 244. The storage device 240 may then return the found results to the host 220. For example, the storage device 240 may transfer to the host 220 information corresponding to four keys ABCDEFGH, ABCDFFFF, ABCDGGGG, and ABCDHJKF.

Accordingly, the host 220 may request the iterator operation from the storage device 240 without having to manage mapping information for translating a key into a logical address or a physical address. Also, the host 220 may transfer a key that is being actually used in the host 220 without additional translation to the storage device 240 to request the iterator operation, and the storage device 240 may perform the iterator operation with reference to mapping information that the storage device 240 manages.

Figure 3:
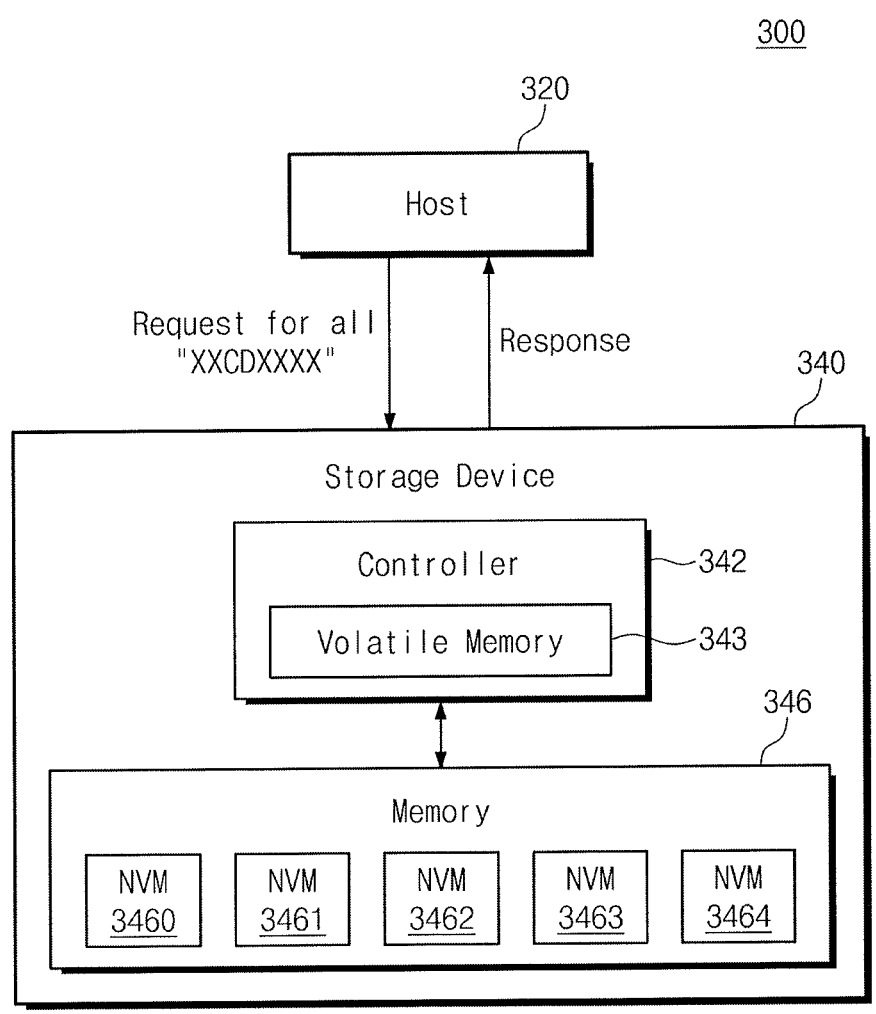
FIG. 3 illustrates another embodiment of a system.

FIG. 3 illustrates another embodiment of a system 300, which, for example, may be more detailed embodiment of the system 100 of FIG. 1 for performing the iterator operation. The description given with regard to the system 100 of FIG. 1 may be applied to the system 300 of FIG. 3. For example, the host 320, storage device 340, controller 342, and memory device 346 in FIG. 3 may correspond to the host 120, storage device 140, controller 142, and memory device 146 of FIG. 1, respectively.

According to an embodiment, the memory device 346 may include a plurality of non-volatile memories 3460, 3461, 3462, 3463, and 3464. In the embodiment of FIG. 3, the memory device 346 is implemented with a plurality of non-volatile memories. In other embodiments, the memory device 346 may be implemented with different types of memory devices (e.g., volatile memories) for storing data.

According to an embodiment, the system 300 may use key-value mapping information, stored in the host 320, for the iterator operation. For example, a response to an iterator command may be determined with reference to key-value mapping information stored in a DRAM of the host 320.

In one embodiment, as described, for example, with reference to FIG. 2, the key-value mapping information may be managed in the storage device 340. When the key-value mapping information is managed in the storage device 340, it may be difficult to manage mapping information about the entire region of a key to be used in the host 320, due to a limited resource of the storage device 340. For example, when the total size of a key to be used in the host 320 is greater than a reference value (e.g., the maximum size of a key capable of being processed by a storage device), it may be difficult to map and manage the entire region of a key and an address of a value in the storage device 340.

For example, when the total size of a key to be used in the host 320 is 255 bytes, it may be difficult to store information for the entire region of a key (e.g., a key of a 255-byte size) in key-value mapping information. This is because the storage device 340 may have restricted resources compared with the host 320.

Accordingly, the storage device 340 that receives a request for the iterator operation from the host 320 may obtain information about the entire region of a key by searching the memory device 346 and accessing a region where data are actually stored. For example, consider the case where the host 320 makes a request to the storage device 340 for information about all keys having characters at the third and fourth positions, e.g., keys having XXCDXXXX where X is any arbitrary character. In this case, when transferring a key of XXCDXXXX to the storage device 340, the controller 342 may access all the non-volatile memories 3460, 3461, 3462, 3463, and 3464 and may search for all keys having characters C and D at the third and fourth positions, respectively. In this embodiment, to perform the iterator operation, the storage device 340 may access the non-volatile memories 3460, 3461, 3462, 3463, and 3464 in the memory device 346 to perform a search operation.

According to an embodiment, the storage device 340 may use partial key-value mapping information indicating a correspondence relationship between a value address and a partial key being a partial region of a key, not the entire region of the key. Below, for convenience of description, the entire region of a key being actually used in the host 320 is referred to as an "entire key." A partial region of a key to be used to manage mapping information in the storage device 340 is referred to as a "partial key." For example, when the entire key is ABCDEFGH, the partial key may be CDEFGH.

According to an embodiment, the partial key-value mapping information may be managed by a volatile memory device 343 of the storage device 340. In this embodiment, the storage device 340 is an SSD, the volatile memory device 343 in which partial key-value mapping information is stored is a DRAM, and the non-volatile memories 3460, 3461, 3462, 3463, and 3464 in which the information about the entire key may be stored are flash memories. These storage, memory devices, and memories may be different in other embodiments.

The storage device 340 may manage key-value mapping information using a partial region of the entire key without performing additional translation (e.g., hashing) on a key actually being used in the host 320.

Figure 4:
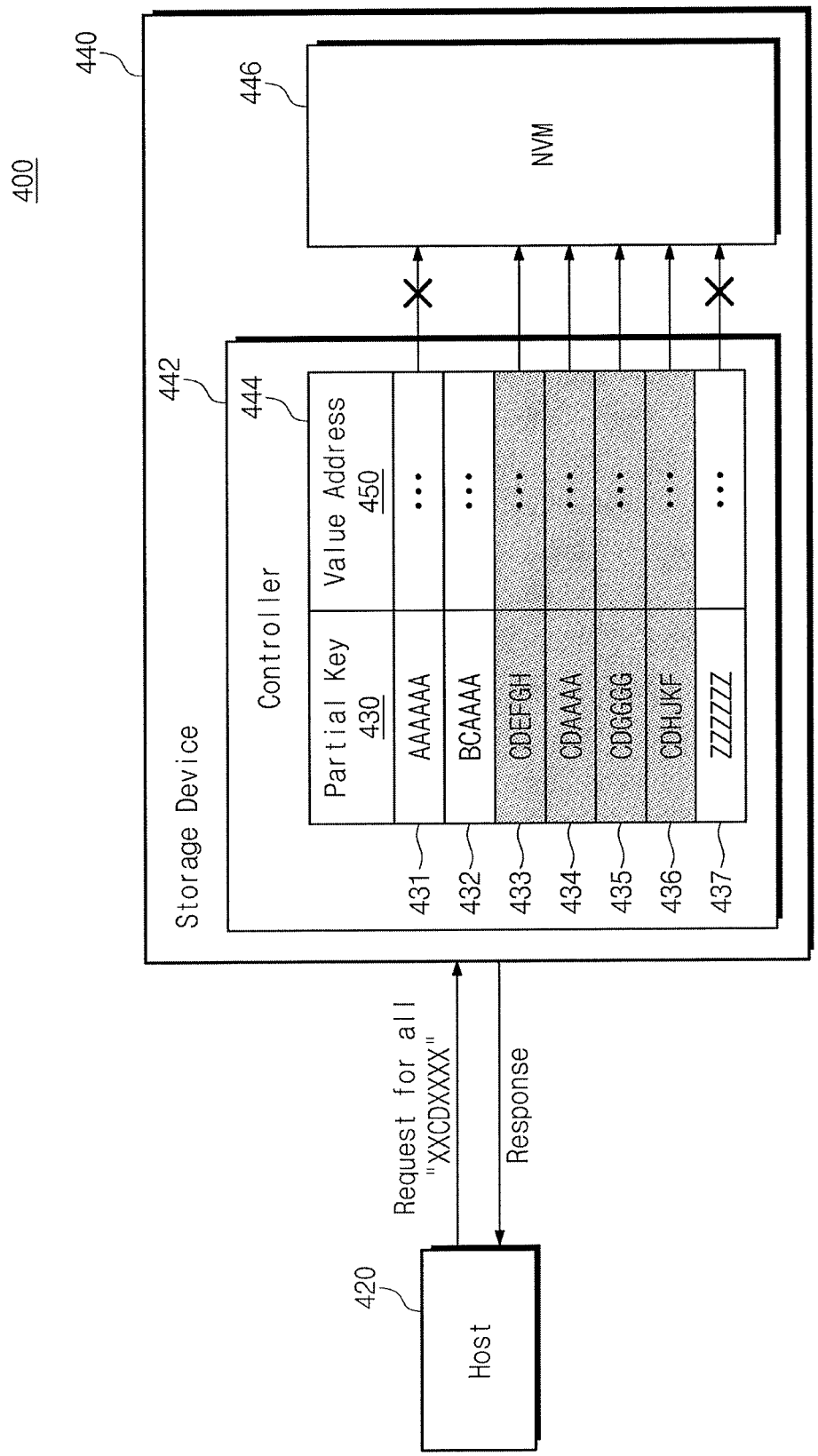
FIG. 4 illustrates another embodiment of an iterator operation.

FIG. 4 illustrates an iterator operation that may be performed in the system of FIG. 3. Referring to FIG. 4, a system 400 may be illustrative of one embodiment of an iterator operation that may be performed in the system 300 of FIG. 3. The above description given with regard to the system 300 of FIG. 3 may be applied to the system 400 of FIG. 4. The host 420 and the storage device 440 may correspond to the host 320 and the storage device 340 of FIG. 3, respectively. Also, a volatile memory device for controller 442 corresponding to the volatile memory device 343 of FIG. 3 may be exist. Also, a non-volatile memory device 446 may correspond to at least one of the non-volatile memory devices 3460, 3461, 3462, 3463, and 3464 of FIG. 3.

According to an embodiment, the volatile memory device of the controller 442 may manage partial key-value mapping information 444 for managing mapping information between partial keys and value addresses. The non-volatile memory device 446 may include one or more blocks, and one block may include one or more pages. The non-volatile memory device 446 is a physical region in which user-requested data are actually stored.

According to an embodiment, the host 420 may request information about all keys having values at third and fourth positions that are the same as values at the third and fourth positions of a transmitted key XXCDXXXX, from the storage device 440 together with XXCDXXXX.

A controller 442 that receives a request for the iteration operation may refer to the partial key-value mapping information 444 in the volatile memory device. In FIG. 4, the partial key-value mapping information 444 is illustrated in the form of a table in which a partial key 430 is recorded at the left column and a value address 450 is recorded at the right column. The partial key-value mapping information 444 may be in a different form in another embodiment.

The controller 442 may search for partial keys having characters C and D at third and fourth positions, respectively, with reference to partial keys recorded at the left column of the partial key-value mapping information 444. According to an embodiment, the controller 442 may further include information about an offset value for search.

The offset value may be one of pieces of information that allows the iterator operation to be possible between the storage device 440 (which manages mapping information using a partial key) and the host 420 which uses the entire key, by using a key-value interface. For example, the offset value may represent how much a partial key is spaced apart from the first position or the last position of the entire key. For example, the controller 442 may receive information indicating that the offset value is 3 from the host 420 and may know that the first position of a partial key corresponds to the third position of the entire key.

Accordingly, characters of the first and second positions of each partial key stored in the partial key-value mapping information 444 may be respectively compared with characters of the third and fourth positions of a received key. The controller 442 may determine partial keys recorded at rows 433, 434, 435, and 436 of the left column as partial keys necessary for the iterator operation.

The controller 442 may determine a partial region (which is to be read for the iterator operation) of the non-volatile memory device 446 with reference to only value addresses recorded at the right column of the rows 433, 434, 435, and 436. According to an embodiment, the controller 442 may obtain a physical address (e.g., a physical block number (PBN) or a physical page number (PPN)) using the partial key-value mapping information 444 and may determine at least a partial region (which is to be read) of the non-volatile memory device 446 based on the obtained physical address. For example, since a partial key having characters in the third and fourth positions of C and D, respectively, is not recorded at the rows 431, 432, and 437 of the left column, the controller 442 may exclude non-volatile memory regions (indicated by value addresses recorded at the right column of the rows 431, 432, 437) from an access and search target for the iterator operation.

Finally, the storage device 440 may obtain the entire key (e.g., the entire region of a key) from a partial region of the non-volatile memory device 446 and may return the obtained entire key to the host 420.

According to an embodiment, the storage device 440 may manage only mapping information indicating a correspondence relationship between partial keys and value addresses, thus efficiently managing mapping information for the iterator operation. Also, since the storage device 440 refers to the partial key-value mapping information, all memories may not be accessed and read for the iterator operation. Accordingly, the storage device 440 may quickly respond to a request for the iterator operation from the host 420.

Figure 5:
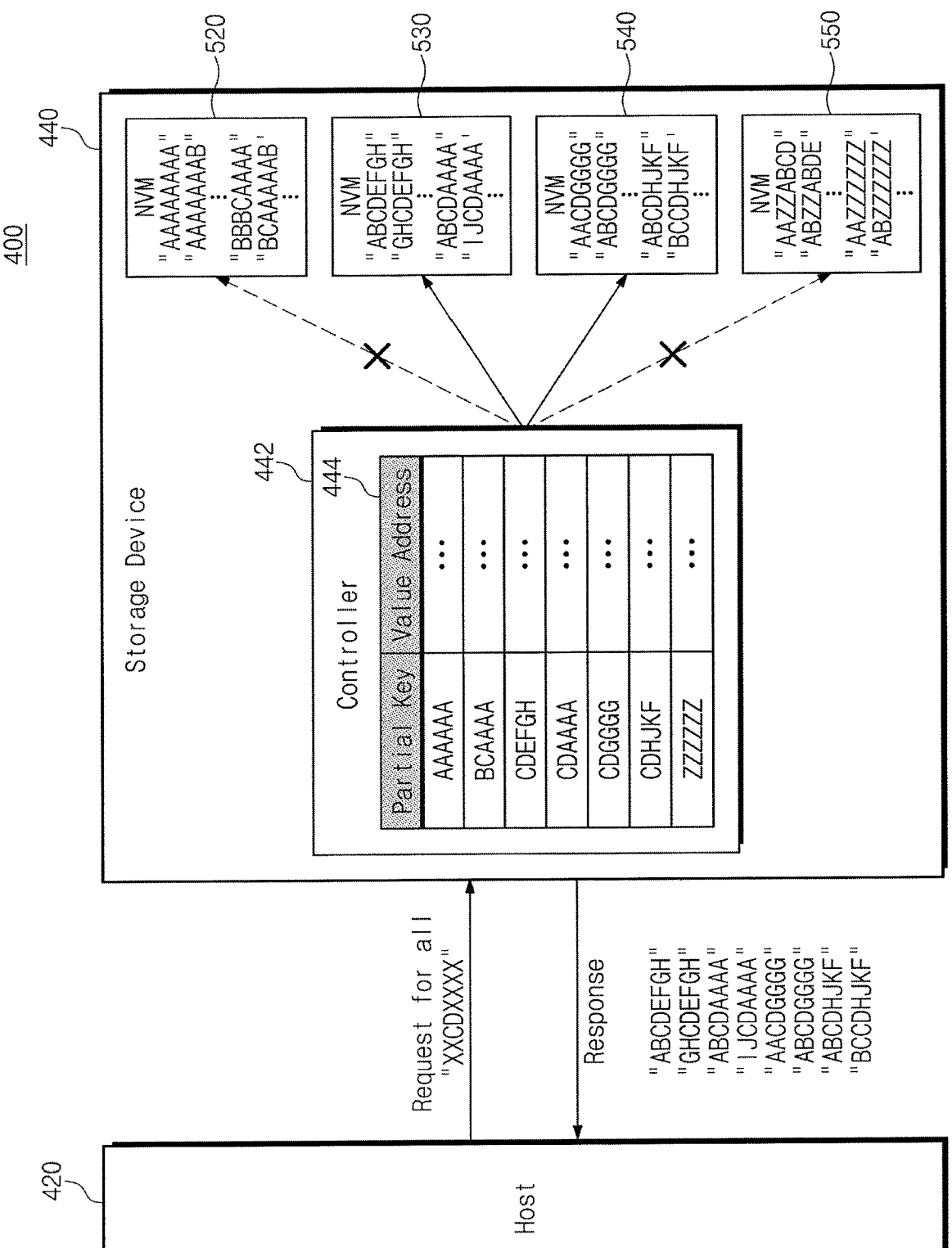
FIG. 5 illustrates an embodiment of an iterator operation that uses partial key-value mapping information.

FIG. 5 illustrates an embodiment of an iterator operation performed using partial key-value mapping information. In this embodiment, for example, the host 420 may make a request to the storage device 440 for information about all keys corresponding to XXCDXXXX.

The storage device 440 receiving the request may determine some non-volatile memories 530 and 540 among a plurality of non-volatile memories 520, 530, 540, and 550 with reference to the partial key-value mapping information 444 as a read target. Information about the entire key may be recorded at each of the non-volatile memories 520, 530, 540, and 550. For convenience of description, only some of entire keys recorded at each non-volatile memory are illustrated, e.g., the non-volatile memory 520 may include keys AAAAAAAA, AAAAAAAB, BBBCAAAA, and BCAAAAAB.

According to an embodiment, the storage device 440 may return information about the entire keys ABCDEFGH, GHCDEFGH, ABCDAAAA, IJCDAAAA, AACDGGGG, ABCDGGGG, ABCDHJKF, and BCCDHJKF from the non-volatile memories 530 and 540 to the host 420. Each of the memories 520, 530, 540, and 550 may be a non-volatile memory or a different type of memory (e.g., volatile memory) in another embodiment.

Figure 6:
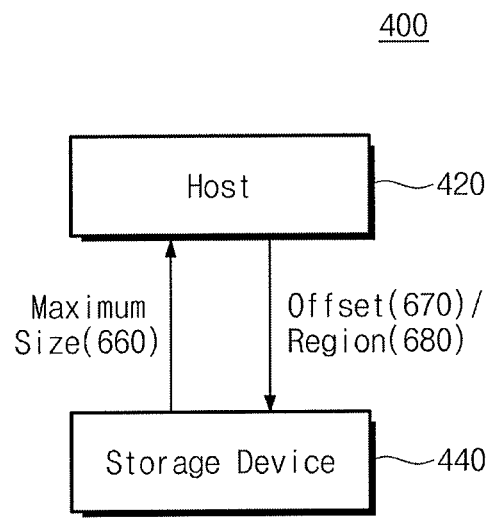
FIG. 6 illustrates an embodiment for transferring information between a host and a storage device using partial key-value mapping information.

FIG. 6 illustrates an embodiment for transferring information between a host and a storage device to use partial key-value mapping information. According to this embodiment, partial keys to be used in the storage device 440 may be determined, for example, based on at least one of the maximum size of a key available in the storage device 440, an offset necessary for the iterator operation, and a region value.

For example, the maximum size of a key available to manage mapping information in the storage device 440 may be 6 and the entire size of an actual key available in the host 420 of FIG. 4 may be 8. Under these conditions, an iterator operation may be performed when the host 420 (using a key having a size of 8) makes a request to the storage device 440 for information about all keys having characters at the third and fourth positions that are the same as the characters in the third and forth positions of a transferred key ABCDEFGH. The storage device 440 may then return a result with reference to partial key-value mapping information.

According to an embodiment, in order to prepare the partial key-value mapping information for the iterator operation, the storage device 440 may transfer 6 (which is a maximum size value 660 of a key available in the storage device 440) to the host 420.

Since a position in a key for the iterator operation starts from the third position, the host 420 may determine an offset value 670 as 3. As described above, the offset value 670 may be information that allows the iterator operation to be possible between the storage device 440 (which manages mapping information by using a partial key) and the host 420 which uses the entire key, by using a key-value interface.

A region value 680 may refer to the size of a partial key to be used in the storage device 440 to manage mapping information. The region value 680 may be determined to be equal to or greater than the size of a key region to be compared with a key received from the host 420 for the iterator operation and equal to or less than the maximum size value 660.

Figure 7:
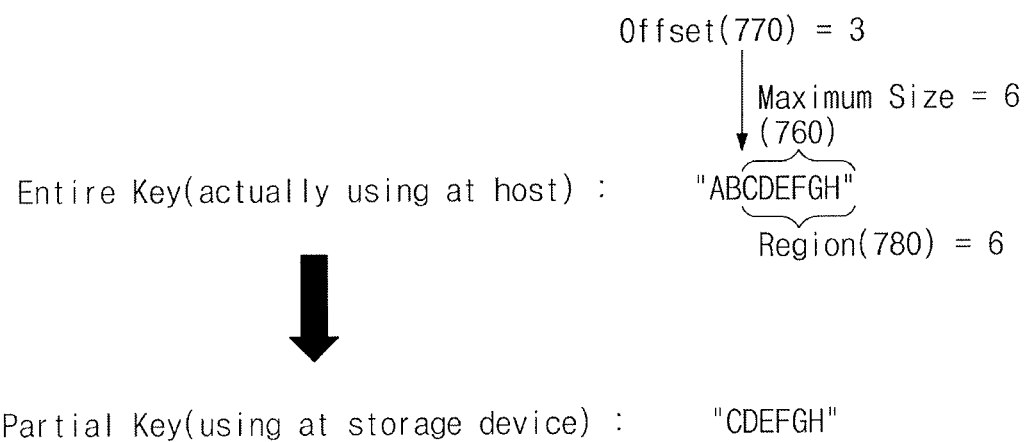
FIG. 7 illustrates an example of information that may be used for partial key-value mapping information.

Referring to FIG. 7, when the entire key to be actually used in the host 420 is ABCDEFGH, a partial key to be used in the storage device 440 to manage mapping information for the iterator operation may be CDEFGH. In this case, the storage device 440 may determine a maximum size value 760 as 6 and may transfer the determined value to the host 420. The host 420 may set an offset value 770 to 3 and may transfer the determined value to the storage device 440. In this case, a specific position where comparison is made for the iterator operation may correspond to a position that starts from the third position (depending on the offset value 770) and is equal to or less than the eighth position (the offset value 770+the maximum size value 760−1). The region value 780 may be determined to be equal to or less than 6 being the maximum size value 760 and to be equal to or greater than 2 being the size of a region (e.g., the third position and the fourth position) where comparison is made.

According to an embodiment, a specific position, at which a comparison with a partial key in the partial key-value mapping information is made for the iterator operation, may be determined in consideration of the maximum size value 760 of a key available to manage mapping information in the storage device 440. For example, when the maximum size value 760 of a key available in the storage device 440 is K, a specific position for requesting the iterator operation may include at least one of the N-th to (N+K−1)-th positions.

Also, according to an embodiment, the specific position at which comparison with a partial key in the partial key-value mapping information is made for the iterator operation may be determined in consideration of the offset value 770. For example, when the offset value 770 is L, a specific position for requesting the iterator operation may start from the L-th position of the entire key. For example, when the maximum size value 760 of a key available in the storage device 440 is K and the offset value 770 is L, a specific position for requesting the iterator operation may correspond to at least one of the N-th to (N+K−1)-th positions of a key that a host uses. In other words, when a specific position (at which comparison with a partial key of the partial key-value mapping information is made for the iterator operation) exists after the Y-th position, the offset value 770 may be determined to have a value equal to or less than Y.

The system 400 may determine a partial key, to be used to manage mapping information in the storage device 440, based on at least one of the maximum size value 760 of a key available in the storage device 440, the offset value 770 for the iterator operation, and the region value 780. The system 400 may configure the partial key-value mapping information based on the determined partial key. The size of the entire key available in the host 420 and/or the size of the partial key available in the storage device 440 may be different in another embodiment.

According to an embodiment, at least one information (e.g., 760, 770, and 780) for determining a partial key to be used in the storage device 440 may be determined in initializing key-value mapping information for managing a database or immediately after the key-value mapping information is map erased. A method for determining a partial key to be used in the storage device 440 may be determined depending on various methods without limitation to the above-described embodiment.

Figure 8:
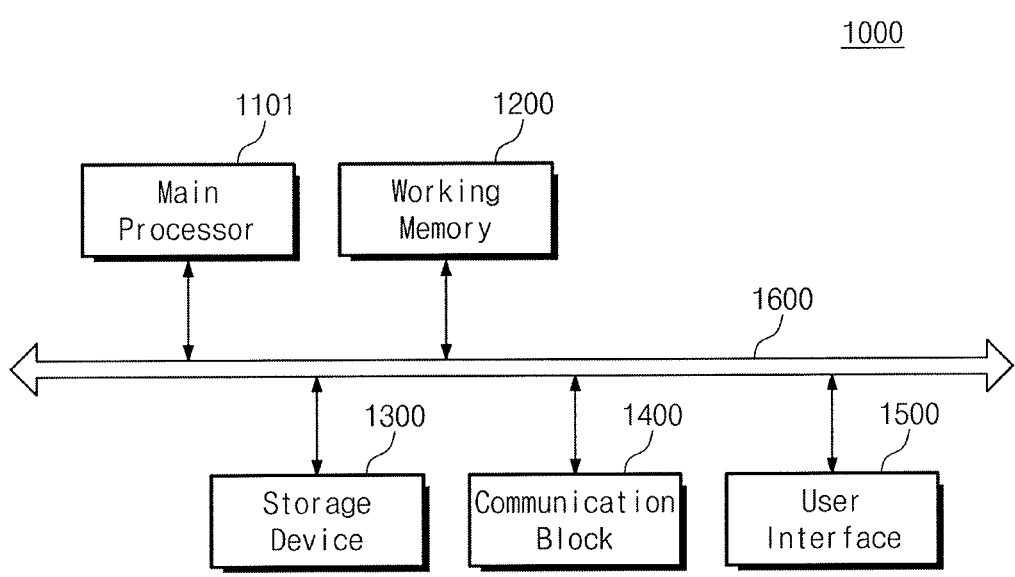
FIG. 8 illustrates an embodiment of an electronic system.

FIG. 8 illustrates an embodiment of an electronic system 1000 which may include a main processor 1101, a working memory 1200, a storage device 1300, a communication block 1400, a user interface 1500, and a bus 1600. For example, the electronic system 1000 may be one of electronic devices such as a desktop computer, a laptop computer, a tablet computer, a smartphone, a wearable device, a video game console, a workstation, a server, and an electric vehicle. According to an embodiment, the electronic system 1000 may include any one of the systems described with reference to FIGS. 1 to 7. For example, the electronic system 1000 may include the system 400 of FIG. 4.

The main processor 1101 may control overall operations of the electronic system 1000 and may process various kinds of arithmetic operations and/or logical operations. The main processor 1101 may include, for example, a special-purpose logic circuit (e.g., a field programmable gate array (FPGA) or application specific integrated chips (ASICs)). For example, the main processor 1101 may include one or more processor cores and may be implemented with a general-purpose processor, a special-purpose processor, or an application processor.

The working memory 1200 may store data to be used for an operation of the electronic system 1000. For example, the working memory 1200 may temporarily store data that are processed, or will be processed, by the main processor 1101. The working memory 1200 may include, for example, a volatile memory such as a DRAM, a SDRAM, and/or a nonvolatile memory such as a PRAM, a MRAM, a resistive RAM (ReRAM), or a FRAM.

The storage device 1300 may include at least one memory device and a controller. The memory device of the storage device 1300 may retain data regardless of power supply. For example, the storage device 1300 may include a nonvolatile memory device such as a flash memory, a PRAM, a MRAM, a ReRAM, or a FRAM. For example, the storage device 1300 may include a storage medium such as a solid state drive (SSD), card storage, or embedded storage.

The communication block 1400 may communicate with an external device/system of the electronic system 1000. For example, the communication block 1400 may support at least one, of various wireless communication protocols such as long term evolution (LTE), worldwide interoperability for microwave access (WiMax), global system for mobile communication (GSM), code division multiple access (CDMA), Bluetooth, near field communication (NFC), and wireless fidelity (Wi-Fi), radio frequency identification (RFID) and/or at least one of various wired communication protocols such as transfer control protocol/Internet protocol (TCP/IP), universal serial bus (USB), and Firewire.

The user interface 1500 may perform communication mediation between a user and the electronic system 1000. For example, the user interface 1500 may include input interfaces such as a keyboard, a mouse, a keypad, a button, a touch panel, a touch screen, a touch pad, a touch ball, a camera, a microphone, a gyroscope sensor, and a vibration sensor. For example, the user interface 1500 may include output interfaces such as a liquid crystal display (LCD) device, a light emitting diode (LED) display device, an organic LED (OLED) display device, an active matrix OLED (AMOLED) display device, a speaker, and a motor.

The bus 1600 may provide a communication path between the elements of the electronic system 1000. The elements of the electronic system 1000 may exchange data with each other based on a bus format of the bus 1600. For example, the bus format may include one or more of various interface protocols such as USB, small computer system interface (SCSI), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS).

According to an embodiment, the storage device 1300 may perform the iterator operation described with reference to FIGS. 1 to 7. In one embodiment, the storage device 1300 may include the storage device 440 of FIG. 4. In one embodiment, the storage device 1300 may receive, from the main processor 1101, a command using a key as a parameter and may perform the iterator operation by using key-value mapping information in the storage device 1300. The key-value mapping information may be the partial key-value mapping information indicating a correspondence relationship between a partial key and a value address. The partial key is a partial region of a key. Since the storage device 1300 refers to the partial key-value mapping information, all memories may not be accessed or read for the iterator operation. Accordingly, the storage device 1300 may quickly respond to a request for the iterator operation received from the main processor 1101.

According to an embodiment, since the main processor 1101 communicates with the storage device 1300 through the bus 1600, the main processor 1101 may request the iterator operation from the storage device 1300. The main processor 1101 may include, for example, the host 420 of FIG. 4. In one embodiment, the main processor 1101 may request the iterator operation from the storage device 1300 and may perform at least one of recompression, garbage collection, rebuild, and consistency check based on the received result of the iterator operation.

Figure 9:
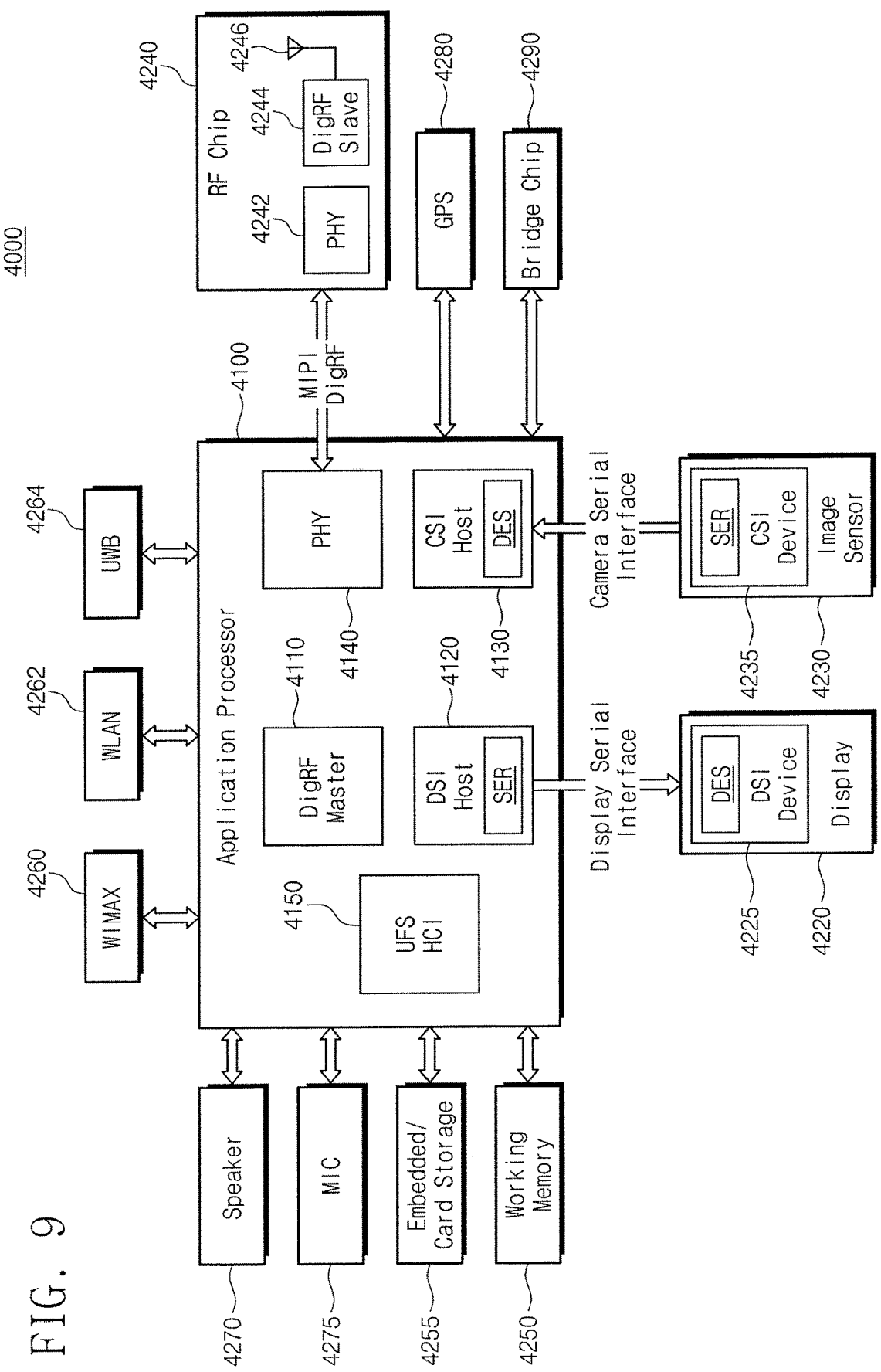
FIG. 9 illustrates an embodiment of an electronic device.

FIG. 9 illustrates an embodiment of a configuration and interfaces of an electronic device 4000 adopting an electronic circuit. The electronic device 4000 may be implemented with a data processing device that is able to use or support an interface protocol proposed by the MIPI alliance. For example, the electronic device 4000 may be one of electronic devices such as a portable communication terminal, a personal digital assistant (PDA), a portable media player (PMP), a smartphone, a tablet computer, and a wearable device.

The electronic device 4000 may include an application processor 4100, a display 4220, and an image sensor 4230. The application processor 4100 may include a DigRF master 4110, a display serial interface (DSI) host 4120, a camera serial interface (CSI) host 4130, a physical layer 4140, and an UFS host-controller interface (HCl) 4150.

The DSI host 4120 may communicate with a DSI device 4225 of the display 4220 through DSI. For example, a serializer SER may be implemented in the DSI host 4120, and a deserializer DES may be implemented in the DSI device 4225.

The CSI host 4130 may communicate with a CSI device 4235 of the image sensor 4230 through a CSI. For example, a deserializer DES may be implemented in the CSI host 4130, and a serializer SER may be implemented in the CSI device 4235. The electronic device 4000 may further include a radio frequency (RF) chip 4240 that communicates with the application processor 4100. The RF chip 4240 may include a physical layer 4242, a DigRF slave 4244, and an antenna 4246. For example, the physical layer 4242 of the RF chip 4240 and the physical layer 4140 of the application processor 4100 may exchange data with each other through DigRF interface proposed by the MIPI alliance.

The electronic device 4000 may further include a working memory 4250 and an embedded/card storage device 4255. The working memory 4250 may temporarily store data processed or to be processed by the application processor 4100. The working memory 4250 may include a volatile memory such as a static random access memory (SRAM), a DRAM, or a SDRAM, and/or a nonvolatile memory such as a flash memory, a PRAM, a MRAM, a ReRAM, or a FRAM.

The embedded/card storage device 4255 may store data provided from the application processor 4100 or may provide the stored data to the application processor 4100. The embedded/card storage device 4255 may include a nonvolatile memory that stores data regardless of whether power is supplied thereto. The embedded/card storage device 4255 may perform the iterator operation described with reference to FIGS. 1 to 7. According to an embodiment, the embedded/card storage device 4255 may receive a request for the iterator operation from the application processor 4100 and may perform the iterator operation by using key-value mapping information. The key-value mapping information may be the partial key-value mapping information indicating a partial key that corresponds to a partial region of a key and a correspondence relationship between the partial key and a value address Since the embedded/card storage device 4255 refers to the partial key-value mapping information, all memories may not be accessed and read for the iterator operation. Accordingly, the embedded/card storage device 4255 may quickly respond to a request for the iterator operation received from the application processor 4100.

The embedded/card storage device 4255 may communicate, for example, with the application processor 4100 based on the UFS communication protocol. In this example, the application processor 4100 may process communication with the embedded/card storage device 4255 through the UFS HCI 4150.

The electronic device 4000 may communicate with an external device/system through communication modules, such as a worldwide interoperability for microwave access (WiMAX) 4260, a wireless local area network (WLAN) 4262, and an ultra-wideband (UWB) 4264. The electronic device 4000 may further include a speaker 4270 and a microphone 4275, which are used to process voice information. The electronic device 4000 may further include a global positioning system (GPS) device 4280 for processing position information. The electronic device 4000 may further include a bridge chip 4290 for managing connection with peripheral devices.

Figure 10:
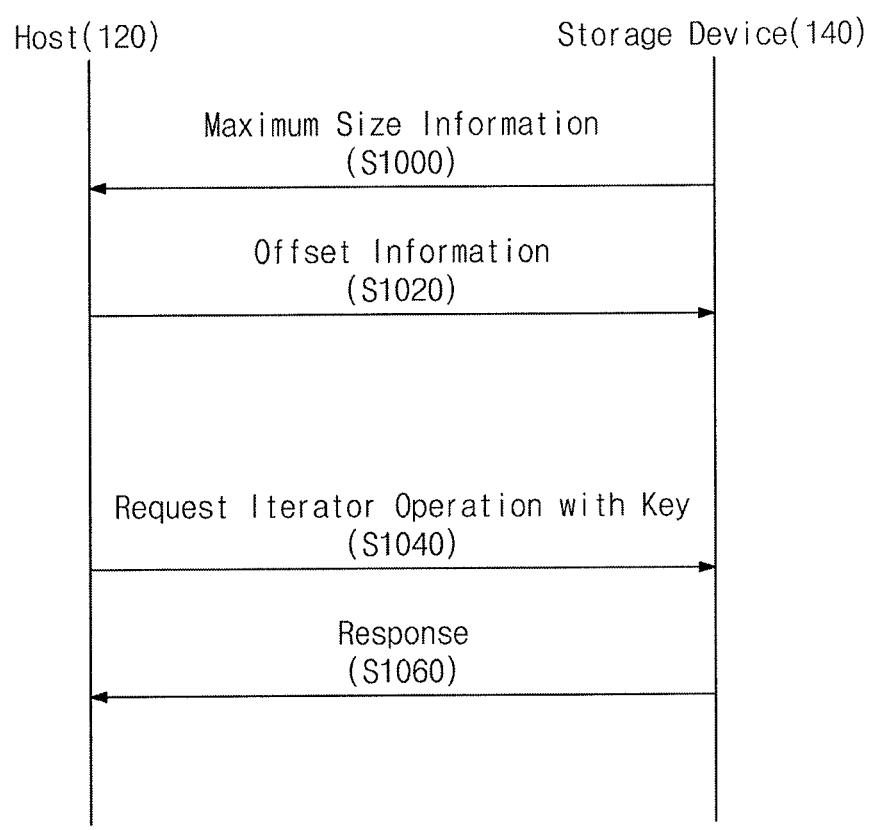
FIG. 10 illustrates an embodiment of a method for performing an iterator operation in a database using a key-value interface.

FIG. 10 illustrates an embodiment of a method for performing an iterator operation in a system. In operation S1000, the storage device 140 may initialize communication with the host 120. The host 120 and the storage device 140 may manage data while communicating with each other. The storage device 140 may include a memory device for storing data. For example, the memory device may include at least one non-volatile memory. The storage device 140 may transfer a variety of information for using a key-value interface. For example, to configure partial key-value mapping information, the storage device 140 may transfer, to the host 120, information about the maximum size of a key available in the storage device 140. The information of the maximum size of the key may be used to determine the size of partial keys to be managed in the storage device 140 and to determine a specific position for a request of the iterator operation.

In operation S1020, the storage device 140 may transfer an offset value to the storage device 140. The offset value may be information that allows communication to be possible between the storage device 140 (which manages mapping information by using a partial key) and the host 120 (which uses the entire key) by using a key-value interface. For example, the offset value may represent how much a partial key is spaced apart from the first position or the last position of the entire key.

Also, the host 120 may transfer information about a region to the storage device 140. The information about the region that is a value associated with the size of a partial key may be determined to have a value that is equal to or greater than the size of a key region where comparison with a key received from the host 120 is made for the iterator operation and is equal to or less than the maximum size of a key available in the storage device 140.

In operation S1040, the host 120 may request the iterator operation from the storage device 140. The storage device 140 may receive, from the host 120, a value corresponding to data to be stored in at least one memory device and a key to be referenced to identify the value. For example, the host 120 may make a request to the storage device 140 for information about all keys having characters at the third and fourth positions that are the same as characters at the third and fourth positions of a transferred key ABCDEFGH. The host 120 may transfer, to the storage device 140, an iterator command requesting information about all keys having characters at third and fourth positions that are C and D, respectively. Embodiments of the iterator operation are described with reference to FIGS. 1 to 7.

In operation S1060, the storage device 140 may return the information about all keys to the host 120. The storage device 140 may return the requested information about all requested keys to the host 120 using key-value mapping information stored in the storage device 140, depending on the request received from the host 120. The storage device 140 may refer to the key-value mapping information for the iterator operation. According to an embodiment, the storage device 140 may use partial key-value mapping information indicating a correspondence relationship between a value address and a partial key being a partial region of a key, not the entire region of the key. Information about the entire region of the key including the partial key may be stored in a non-volatile memory of the storage device 140.

Operation S1060 may include determining a partial area of at least one memory device, which is to be read, using the partial key-value mapping information and performing a read operation on the determined partial region. For example, the storage device 140 may perform a read operation only on at least a partial region in the non-volatile memory to obtain the information about all keys requested in operation S1040. The obtained information about all keys may be returned to the host 120.

The above-described embodiments may be implemented in a computer-readable recording medium in the form of a computer-readable code. The computer-readable recording medium includes all types of recording devices in which data readable by a computer system are stored. The computer-readable recording medium may include a read-only memory (ROM), a random access memory (RAM), a CD-ROM, a magnetic tape, and a floppy disk, an optical data storage device, and may be implemented in the form of transmission over the Internet. Also, the computer-readable recording medium is distributed over computer systems connected over a network, and a code readable by a processor is stored and executed in a distributed manner.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, processors, comparators, and other signal generating and signal processing features of the disclosed embodiments may be implemented in logic which, for example, may include hardware, software, or both. When implemented at least partially in hardware, the controllers, processors, comparators, and other signal generating and signal processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, processors, comparators, and other signal generating and signal processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. A storage device, comprising:
    a first memory to store data using entire keys that are character strings; and
    a controller, wherein:
    the controller is to receive, from a host, a request for information about any and all entire keys having a subset that matches a partial key, the partial key being a subset of an entire character string of an entire key,
    the controller is to manage partial key-value address mapping information indicating a correspondence relationship between the partial key and a value address, the value address indicating a region of the first memory,
    the controller is to return, to the host in response to the host request, the requested information about any and all entire keys having the subset that matches the partial key regardless of other characters outside the partial key in the entire character string, and
    the controller is to determine the information to be returned to the host by:
        determining a partial region of the first memory based on the partial key-value address mapping information, and
        performing a read operation on the partial region to obtain an entire key.

2. The storage device as claimed in claim 1, wherein:
    the controller includes a second memory, which is a volatile memory, to manage the partial key-value address mapping information, and
    the first memory is a non-volatile memory.

3. The storage device as claimed in claim 1, wherein the controller is to receive, from the host, information corresponding to an offset to be used as a basis for the matching of the partial key and the entire keys.

4. The storage device as claimed in claim 1, wherein the controller is to return the information to the host to perform at least one of recompression, garbage collection, rebuild, and consistency check.

5. An electronic device, comprising:
    a host; and
    a storage device including a first memory to store data using entire keys that are character strings,
    wherein the storage device is to receive, from the host, a request for information about any and all entire keys having a subset that matches a partial key, the partial key being a subset of an entire character string of an entire key, and is to manage partial key-value address mapping information indicating a correspondence relationship between the partial key and a value address, the value address indicating a region of the first memory, and
    wherein the storage device is to return, to the host, the requested information about any and all entire keys having the subset that matches the partial key regardless of other characters in the entire character string outside the subset, the information returned to the host being determined using the key-value mapping information.

6. The electronic device as claimed in claim 5, wherein:
    the storage device includes a controller memory to manage the partial key-value address mapping information, and
    the first memory is to store an entire key of a received key including the partial key.

7. The electronic device as claimed in claim 6, wherein:
    the controller memory is a volatile memory, and
    the first memory is a non-volatile memory.

8. The electronic device as claimed in claim 6, wherein the storage device is to:
    determine a partial region of the first memory using the partial key-value address mapping information, and
    perform a read operation on the partial region of the first memory to obtain the entire key of the received key including the partial key.

9. The electronic device as claimed in claim 8, wherein the storage device is to compare the partial key and the received key based on information about an offset and is to determine the partial region of the first memory depending on a result of the comparison.

10. The electronic device as claimed in claim 8, wherein:
    the first memory includes flash memories, and
    the storage device is to compare the partial key and the received key based on information corresponding to an offset and is to determine at least one flash memory of the flash memories at which the read operation is to be performed depending on a result of the comparison.

11. The electronic device as claimed in claim 5, wherein the partial key is to be determined based on at least one of information about a maximum size of a key that is transferred from the storage device to the host and is available in the storage device, information corresponding to an offset that is transferred from the host to the storage device for the request, and information corresponding to a size of the partial key.

12. A storage device, comprising:
a first memory to store data using entire keys that are character strings; and
a controller to receive, from a host, a request for information about any and all entire keys having a subset that matches a partial key, the partial key being a subset of an entire character string of an entire key and to manage partial key-value address mapping information indicating a correspondence relationship between the partial key and a value address, the value address indicating a region of the first memory,
wherein the controller is to return, to the host, the requested information about any and all entire keys having the subset that matches the partial key regardless of other characters outside the partial key in the entire character string, and
wherein the controller is to determine the information to be returned to the host based on the partial key-value mapping information.

13. The storage device as claimed in claim 12, wherein:
the controller includes a controller memory to manage the partial key-value mapping information, and
the first memory is to store an entire key including the partial key.

14. The storage device as claimed in claim 13, wherein:
the controller memory is a volatile memory, and
the first memory is a non-volatile memory.

15. The storage device as claimed in claim 13, wherein the controller is to:
determine a partial region of the first memory based on the partial key-value mapping information, and
perform a read operation on the partial region to obtain the entire key including the partial key.

16. The storage device as claimed in claim 15, wherein the controller is to:
compare the partial key and a received key using information corresponding to an offset, and
determine the partial region depending on a result of the comparison.

17. The storage device as claimed in claim 15, wherein:
the first memory includes flash memories, and
the controller is to compare the partial key and a received key based on information corresponding to an offset and is to determine at least one flash memory of the flash memories, at which the read operation is to be performed, depending on a result of the comparison.

18. The storage device as claimed in claim 12, wherein the partial key is to be determined based on at least one of information corresponding to a maximum size of a key available in the storage device, information corresponding to an offset for the request, and information corresponding to a size of the partial key.

* * * * *